March 13, 1951     H. C. RENTSCHLER     2,544,724
APPARATUS AND METHOD FOR THE TENDERIZATION OF MEAT
Filed March 18, 1947     2 Sheets—Sheet 1
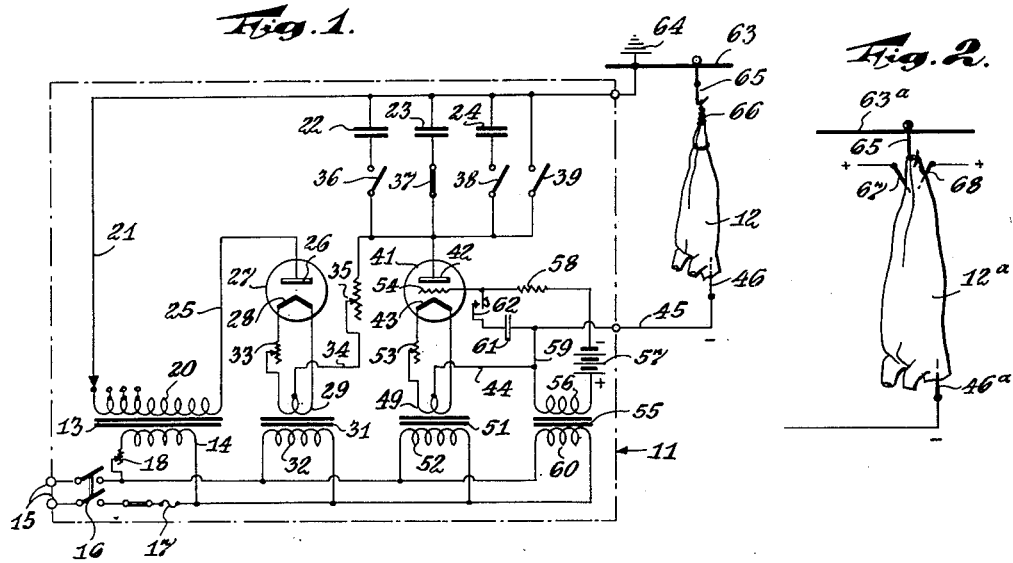
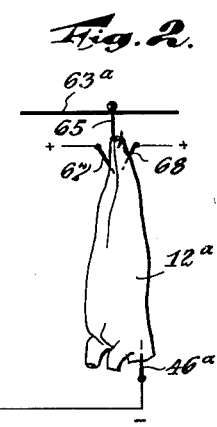
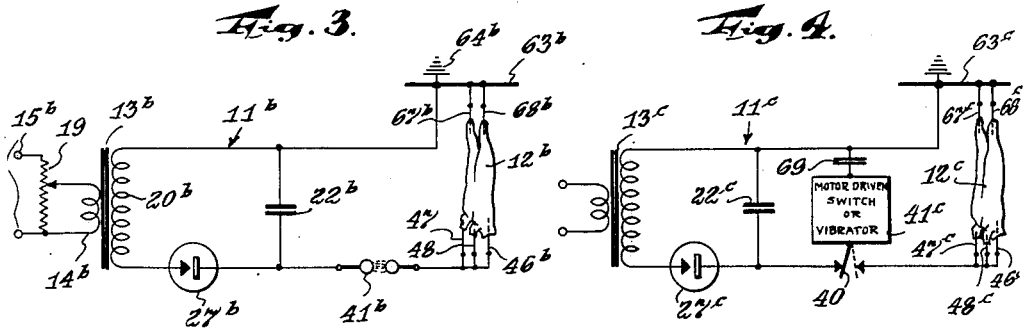
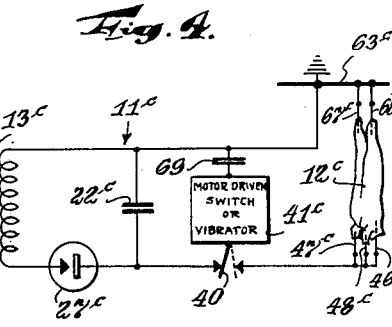
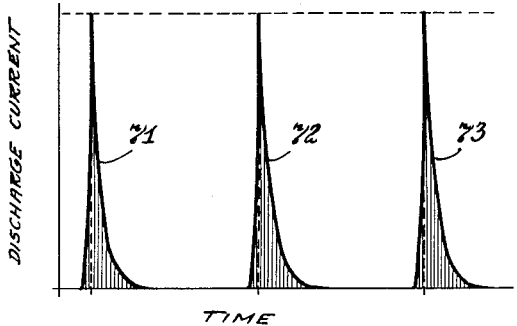
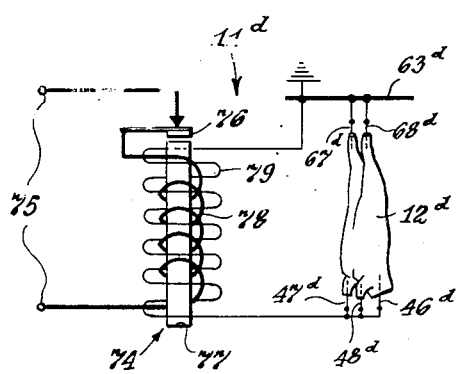
INVENTOR
H. C. RENTSCHLER
BY
ATTORNEY March 13, 1951  H. C. RENTSCHLER  2,544,724
APPARATUS AND METHOD FOR THE TENDERIZATION OF MEAT
Filed March 18, 1947  2 Sheets-Sheet 2
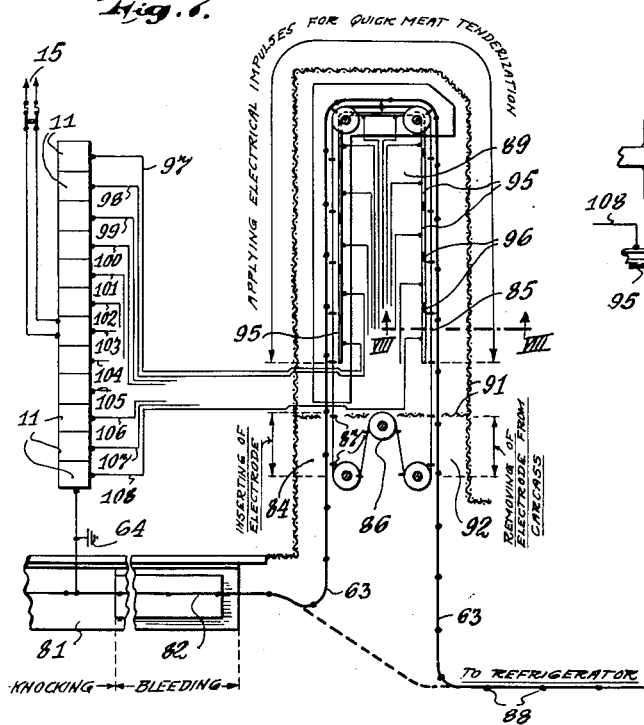
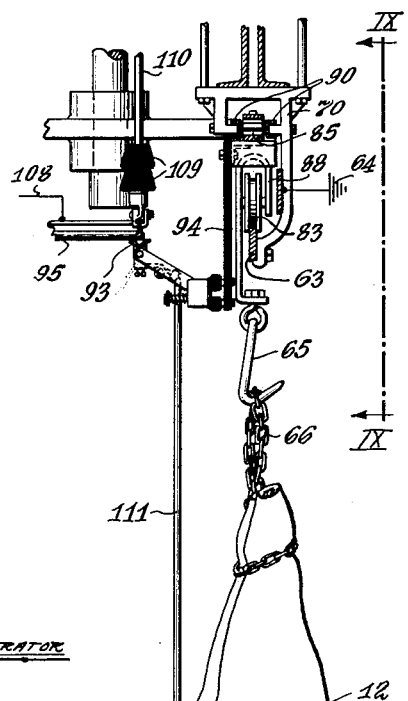
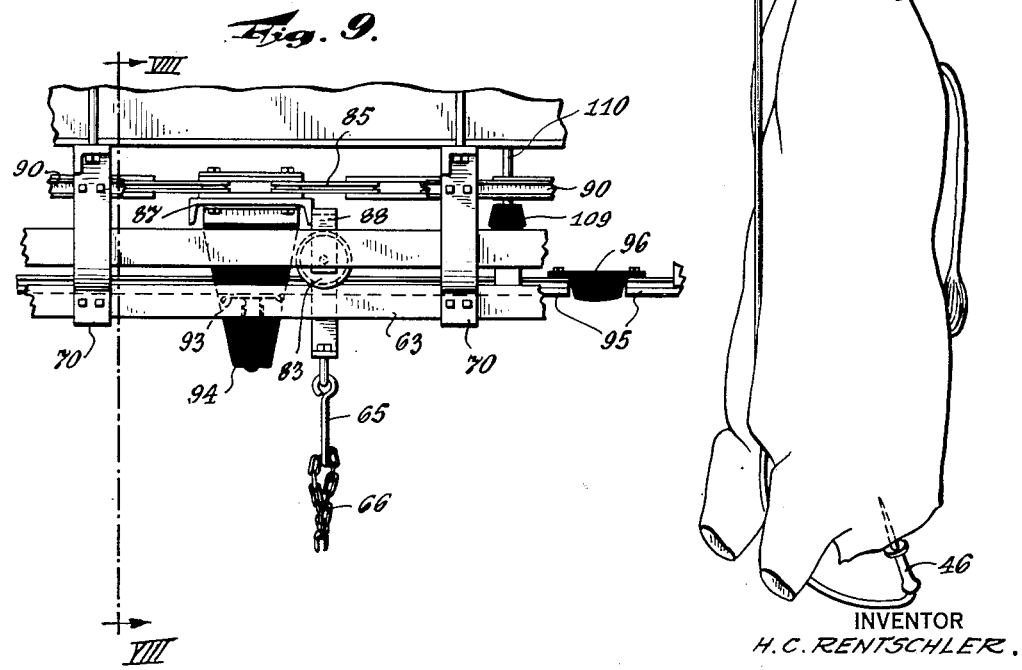
INVENTOR
H. C. RENTSCHLER
BY J. W. Greenhowe
ATTORNEY Patented Mar. 13, 1951

2,544,724

UNITED STATES PATENT OFFICE 2,544,724

APPARATUS AND METHOD FOR THE TENDERIZATION OF MEAT

Harvey C. Rentschler, East Orange, N. J., assignor to Westinghouse Electric Corporation, East Pittsburgh, Pa., a corporation of Pennsylvania Application March 18, 1947, Serial No. 735,335

7 Claims. (Cl. 99—107)

1

This invention relates to meat packing and, more particularly, to apparatus for effecting the tenderization of meat during packing and methods for using such apparatus.

The invention is directed particularly to apparatus for applying electrical impulses to animal carcasses in accordance with the tenderizing process disclosed in Harsham et al., application, Serial No. 611,690, filed August 20, 1945, and now abandoned.

According to a copending application, which continues the subject matter of said Harsham application, a method is disclosed in which tenderization of the muscles and tough tissues in the flesh is caused to take place, without loss of flavor or food value, and without significant shrinkage, within a period of 24 to 30 hours total time, coincident with normal processing and chilling of the carcass. Thus, tender meat is produced within a matter of hours, as distinguished from the days or months of treatment that were the best available according to past practices. Since the time required for this treatment is so short, no noticeable unwanted surface or internal changes occur by way of bacterial action, rancidification of fats or the like. The procedure is employed as an adjunct to the normal slaughtering and dressing out procedure, without requiring extra refrigeration facilities, extra time, or expensive apparatus for conditioning and sterilizing large volumes of circulating air. The rapidity of processing provides a commensurate reduction in inventory expense.

More specifically, the process just disclosed is based upon the discovery that such results may readily be secured by electric stimulation of the fresh meat promptly after slaughtering, to the extent that the irritability of the nerves in the tissue is fully or substantially exhausted. Otherwise expressed, electric irritation is employed to effect release of the latent energy stored within the muscles, nerves or tissue whereby the meat is rendered more susceptible to enzymatic digestion or to chemical alteration capable of making the meat more tender. In practice, the animals after being slaughtered and briefly, within approximately fifteen minutes to half an hour thereafter, are contacted with one or more electrodes to produce galvanic or faradic responses therein with attendant contraction of the muscles.

This treatment conditions or prepares the meat so that tenderization and full ripening occur within a short period of time after introduction of the meat into the chill box; from this point of view therefore, it is proper to characterize the

2 procedure as one for conditioning meat to render it more susceptible to being tenderized.

The present invention is thus directed particularly to apparatus adapted to be used in the practice of the meat tenderizing method just described, which apparatus applies periodic or aperiodic electrical impulses to animals promptly after slaughtering, to thereby induce or establish electrical currents therein at the desired frequency for effecting stimulation and consequent exhaustion of the tissues, whereby tenderization is facilitated.

Therefore, the principal object of my invention, generally considered, is to develop apparatus for applying periodic electrical impulses to animals immediately after slaughter, to thereby induce desired electrical current therein at the desired frequency for effecting stimulation, and consequent exhaustion of the tissues, whereby tenderization is facilitated.

Another object of my invention is to provide apparatus for subjecting freshly-slaughtered animals to a series of electrical impulses at relatively high voltage, but considerably limited, insofar as the current is concerned, thereby effecting the desired nerve reaction, exhaustion of chemical energy in the flesh, and a consequent quick lowering of the pH value, in order to facilitate the action of certain enzymes causing tenderization.

A further object of my invention is to utilize the apparatus, above described, to the best advantage in effecting the tenderization of meat.

Other objects and advantages of the invention will become apparent as the description proceeds.

Referring to the drawings—

Figure 1 is a wiring diagram of apparatus embodying my invention.

Figure 2 shows fragmentary portions of the diagram of Figure 1, slightly modified.

Figure 3 is a wiring diagram corresponding to Figure 1, but showing a modification.

Figure 4 is a wiring diagram corresponding to Figure 1, but showing another embodiment of my invention.

Figure 5 is a diagram illustrating the current impulses which are passed through the meat in accordance with my invention.

Figure 6 is a wiring diagram corresponding to Figure 1, but showing an additional embodiment of my invention.

Figure 7 is a plan of a slaughter house and accessories used for practicing my invention.

Figure 8 is an elevational view of a carcass during the process of being subjected to electrical treatment in accordance with my invention, the apparatus thereabove being shown in vertical section on the line VIII—VIII of Figures 7 and 9.

Figure 9 is a detail elevational view of the apparatus illustrated in Figure 8, viewed from the right as indicated by the arrows on the line IX—IX of Figure 9.

Referring to the drawing in detail, like parts being designated by like reference characters, and first considering the embodiment of my invention illustrated in Figure 1 there is shown apparatus 11 which serves the purpose of transforming alternating electrical current, which may be of the 110 volt, 60 cycle variety, to impulses of current which may be at a high voltage and spaced at predetermined intervals, such impulses being transmitted to a carcass 12, which may be of beef, immediately or soon after knocking and bleeding.

In detail, the apparatus here illustrated comprises a transformer 13, the primary winding 14 of which is connected to a source of power 15, of say, 110 volts, 60 cycles, through a switch 16, a fuse or circuit-breaking device 17, and a voltage or current regulator, such as a rheostat 18 here illustrated, which may, if desired, be replaced by a variac 19 such as illustrated in Figure 3.

The transformer 13 is illustrated as of the "step-up" variety, whereby a voltage of from approximately 500 to 3,000 volts may be obtained. One side of the secondary winding 20 is connected through a line 21 to one side of a series of condensers 22, 23 and 24, the other being connected through line 25 to the anode 26 of a rectifier 27, which may be of the type designated WL-866, as manufactured by the Westinghouse Electric Corporation. The rectifier hot cathode 28 is activated from the secondary winding 29 of a transformer 31, the primary winding 32 of which is shown connected to the same source of power 15. In this case, the transformer is of the "step-down" variety and the current therefrom, to the cathode 28, is controlled in any desired manner, as by means of a rheostat 33. The cathode 28 is connected through line 34 and rheostat 35 to the other side of the condensers 22, 23 and 24, through switches 36, 37 and 38, adapted to be selectively used, switch 37 being shown closed. A switch 39 may serve to short-circuit the selected condenser or condensers, when desired.

The purpose of the condenser or condensers which are selected by the use of a switch or switches, is to deliver electrical impulses of a desired character to the carcass 12 undergoing treatment. The power from said condensers is illustrated as controlled by means of a thyratron 41, which may be of the type designated KU-627, as manufactured by the Westinghouse Electric Corporation, the anode 42 of which is connected to the line connecting the switches 36 to 39, inclusive. The hot cathode 43 of the thyratron 41 is connected to the carcass 12 by lines 44, 45, and electrode 46 which may be imbedded in the neck, as illustrated. As an alternative, other electrodes 47 and 48 may also be used, one in each foreleg as illustrated in Figure 3, said forelegs being left of natural length, or with the hoofs removed, as desired. It will also be understood that while the head is shown removed, yet it may be left in place, except for slitting the neck for bleeding, as desired.

The cathode 43, in the present instance is shown energized from secondary winding 49 of transformer 51, the primary winding 52 of which is shown connected to the same source of power 15. The current to heat the cathode 43 is controlled in any desired manner, as by means of a rheostat 53 in the circuit from the secondary winding 49. The grid 54 of the thyratron is controlled by means of a transformer 55, the primary winding 60 of which may receive power from the source 15.

One terminal of the secondary winding 56 is connected through negative-biasing battery 57 and grid leak 58, to said grid, the triggering control of which is effected by connecting the other terminal of the secondary winding 56 through line 59, condenser 61, and circuit breaking-device 62 to said grid 54, as illustrated. The device 62 may be like a distributor on a car, and is for the purpose of completing the circuit from the secondary winding 56 to the grid 54 for momentarily opposing the negative battery bias on said grid, which prevents discharge from the condenser or condensers, so that electrical impulses, independent of any auxiliary ionizing circuit for momentarily reducing the work-circuit resistance, are delivered from said condenser or condensers through the carcass 12 at desired periods or intervals of time. This is effected in the present embodiment by grounding the rail 63 on which the carcass is supported, as indicated at 64, and also grounding the line 21 to the condensers 22, 23 and 24, whereby when the thyratron 41 is not blocked, as by removing the grid bias or making said grid positive, a condenser discharge will occur from the connected condenser or condensers through the thyratron 41 and carcass 12, this discharge being repeated in accordance with the frequency selected for the purpose.

The embodiment of Figure 2 is similar to that of Figure 1, except that the carcass is shown suspended by fastening the hind legs over the hook 65, instead of suspending them from such a hook by means of a chain 66, and employing electrodes 67 and 68 imbedded in the hind legs near their extremities or hoofs, said electrodes being grounded to the supporting rail 63ª like the chain 66 in the preceding embodiment. In the present embodiment, one electrode, 46ª, or three as illustrated in Figures 3 and 4, may be used as desired for connecting the carcass 12ª to the high potential side of the impulse-generating apparatus.

Referring now to the embodiment of my invention illustrated in Figure 3, there is shown apparatus 11ᵇ which serves to deliver impulses of current to a connected carcass 12ᵇ immediately or soon after knocking and bleeding, as in the first embodiment. In the present embodiment, however, the apparatus comprises a transformer 13ᵇ, the primary winding 14ᵇ of which is connected to a source of power 15ᵇ, say 110 volts, 60 cycles, controlled by a voltage or current regulator, such as the variac 19, or if desired a rheostat such as 18, illustrated in Figure 1. As in the preceding embodiment, the transformer 13ᵇ is illustrated as of the "step-up" type, whereby a relatively high voltage of from about 500 to 3,000 may be obtained in the secondary winding 20ᵇ.

Condenser 22 is charged from said secondary winding 20ᵇ desirably through a "Kenotron" rectifier 27ᵇ, as illustrated, and is connected across the carcass 12ᵇ through a spark gap 41ᵇ, in accordance with the diagram. The rate of charging of the condenser is controlled by the transformer voltage and the temperature of the rectifier cathode filament, which may be adjusted as in the apparatus illustrated in Figure 1. When the condenser charge reaches a predetermined voltage, the spark gap resistance breaks down and the condenser 22$^b$ is discharged through the carcass 12$^b$, which in the present embodiment, is shown as having electrodes 67$^b$ and 68$^b$, one in each hind leg near the extremity or hoof and grounded through rail 63$^b$, as indicated at 64$^b$, and electrodes 47, 48 and 46$^b$, respectively in the forelegs and neck, all of said electrodes being connected to the high or ungrounded negative side of the apparatus through the spark gap 41$^b$.

As an alternative, of course the carcass may be hung as illustrated in Figure 1 and a single or multiple electrode used in the forepart thereof, as illustrated in either Figure 1 or in Figure 3. The voltage may be adjusted by widening or narrowing the spark gap, and the power of the discharge varied by correspondingly changing the condenser capacity. High capacity discharges at high voltage have been shown to rapidly inactivate the animal response, with the result that there was not as good tenderizing results as where the stimulation was continued for a longer period of time. In other words, the tests showed that voltage as well as current is important in attaining tenderization, too great a current literally burning-out the system with little or no improvement in tenderizing action.

As the voltage of normal alternating current through a carcass being treated is raised, the resulting current becomes excessive unless special apparatus, as here illustrated, is used, whereby a moderately high voltage can be applied without excessive average current. That is the reason why the spark gap apparatus of Figure 3 has been improved by the substitution of apparatus such as illustrated in Figure 1.

In accordance with Figure 4, a transformer 13$^c$, rectifier 27$^c$ and condenser 22$^c$ may be used, as in the preceding embodiment. In the present embodiment, however, a motor driven switch or vibrator 41$^c$ has been substituted for the spark gap 41$^b$; said vibrator with a change switch 40, or a contactor similar to a distributor, alternately charging a condenser 69, by connecting it across the condenser 22$^c$ and its transformer 13$^c$, and then discharging it across the carcass 12$^c$ being treated, said carcass being otherwise connected as in Figure 1 or Figure 3, so that it may be suspended from rail 63$^b$ and have electrodes 46$^c$, 47$^c$, 48$^c$, 67$^c$ and 68$^c$.

In all of the preceding embodiments, the impulses of current which are discharged through carcasses under treatment may be as represented in Figure 5. That is, the current rises to a high value in a very short period of time, as represented by the peaks 71, 72 and 73 illustrated, said current falling off in value rapidly, but not quite as rapidly as it rises to a maximum. The length of time the high current flows will seem to be small in comparison with the spacing between the current impulses, whereby the power and average current during treatment is small, as compared to the maximum value of each current impulse. The periodicity is such that the muscles in the carcass have through the nerves a chance to react to each individual impulse, by contraction and relaxation, prior to the occurrence of another stimulating impulse.

Figure 6 is a diagram of a third form of apparatus which may be used for applying electrical impulses to a carcass undergoing treatment. In this case, power is applied to an induction coil 74 from a source of direct current 75, through a make-and-break device or buzzer 76 associated with the iron core 77 thereof, said interrupted current passing to the primary winding 78 of the coil and thereby generating a series of magnetic impulses in said core. By reason of this arrangement, high potential pulses are generated in the secondary winding 79 of the coil and this current serves, because of the connections illustrated, to treat the carcass 12$^d$ having electrodes 46$^d$, 47$^d$, 48$^d$, 67$^d$ and 68$^d$ and suspended from rail 63$^d$, as in the preceding embodiments. Because of the characteristics of the coil, a series of high voltage, low current impulses are delivered to the carcass 12$^d$, whereby the same is treated in a manner similar to that occurring in the preceding embodiments.

Referring now to the apparatus illustrated in Figures 7, 8 and 9, the general system of handling animals in accordance with my invention is to drive the cattle, or other animals, one at a time to position 81 where each is knocked and then hung up on the hook 65 suspended from carriage 88 shown in detail in Figures 8 and 9, either by means of a chain 66, or as illustrated in Figure 2. The animal's throat is then cut at the bleeding position 82, and the carcasss is moved on along a track 63, carried on suitably-supported brackets 70, and on which the carrying wheel 83 of the hook carriage 88 travels, to position 84 where the electrodes 46, 47, 48, 67 and 68, or some of them in accordance with the selected method of connection to the impulse-generating apparatus, are inserted. After that, each carcass is moved automatically by means of an endless pulley-mounted driving chain 85 operated by a suitable drive pulley 86, guided between shoes 90 supported on the brackets 70, and carrying a series of pusher elements or channels 87 each of which engages a carriage 88 carrying a hook 65 and wheel 83, moving said carriage into and out of the treatment area 89, which may be in the form of a tunnel or other space enclosed by a high fence or other device 91 as a protection against operators coming in contact with the high-voltage power rail 95 or connected carcass during treatment, said enclosure device preventing the operators from going beyond the space 84, where the electrodes are inserted, and the space 92, where the electrodes are removed on the return trip.

In order to insure that each carcass is properly treated and, at the same time, that no two carcasses are treated in parallel by one apparatus intended for the treatment of only one carcass at a time, provision is made whereby each carcass is sequentially energized from a series of impulse-generating devices 11, 11$^b$, 11$^c$ or 11$^d$, as the case may be. Figure 7 shows twelve of such devices, designated 11, in a series and power from said devices, is delivered from one at a time to the carcass undergoing treatment, by a current collector or trolley 93 carried on an insulator 94 in turn connected to the channel 87 which pushes a hook-carriage, and spring-pressed upwardly against the power rail 95.

The power rail 95 is formed in sections, corresponding in number with the number of the impulse-generating devices 11, which of course may be replaced by others corresponding with one of those designated 11$^b$, 11$^c$ and 11$^d$, if desired, said sections being separated electrically and secured together by insulators 96. Each section is connected to one of the impulse generating devices 11 by one of the lines 97, 98, 99, 100, 101, 102, 103, 104, 105, 106, 107 and 108, whereby each individual section, suitably supported by rods 110 using insulators 109, is individually energized by apparatus which is independent of the apparatus energizing the adjoining section and other sections. The spacing of the pusher elements 87 along the driving chain 85, corresponds with the length of the power rail sections 95, so that only one carcass at a time is energized from one section 95, and then passed to the next section 95 to be energized. Finally, after it is passed along all twelve sections 95, a desirable length of time for such treatment being about eight minutes, the carcass will emerge at position 92, where an operator removes the electrodes. The carcass is then moved along the rail 63 to be skinned, eviscerated and transported to a refrigerator or other place of storage or transportation.

From the foregoing disclosure, it will be seen that a desired method of using the apparatus illustrated, is to hang on a hook carriage 88 and transport a carcass, immediately or promptly after knocking and bleeding at positions 81 and 82, along rail 63 to the electrode-inserting position 84, where it is connected for receiving electrical treating impulses. The circuit during treatment is from one of the impulse generators 11, 11$^b$, 11$^c$ or 11$^d$, through line 97 to the first power rail section 95, from there to the collector 93, insulated conductor 111, electrode 46, or electrodes 46, 47 and 48, as the case may be, through the carcass 12, chain 66, or electrodes 67 and 68, hook 65, carriage 88, and carrying roller 83 to ground 64. When the carcass has moved so that its collector 93 engages the next section 95, the circuit is from the next impulse-generating apparatus 11, 11$^b$, 11$^c$, or 11$^d$, through line 98, second power rail section 95, collector 93, conductor 11, and so on through the carcass as before to ground 64. The carcass continues over all of the rail sections 95, being energized sequentially through lines 97, 98, 99, 100, 101, 102, 103, 104, 105 and 106 until the treatment is complete, when it emerges at position 92 for removal of the electrodes and transfer to the refrigerator.

It will be understood that, having devised apparatus for efficiently treating carcasses of animals immediately or shortly after knocking and bleeding, the treatment consists in subjecting them to condenser discharges at a predetermined frequency, voltage and amount of energy per impulse. It is desirable to have this electrical stimulation of beef carcasses, for example, or sides of beef, performed as soon as reasonably practicable after the animal has been knocked and bled. After substantially from 1 to 1½ hours the nerves and muscles have lost their irritability to such an extent that little benefit can be obtained by applying the treatment. The optimum length of treatment will, of course, vary from animal to animal, depending upon its history until the time of knocking, and also to some degree upon the type of electrification which is employed. However, in any event, the process should be applied before the nerves and muscles have died or suffered substantial deterioration or loss of irritability.

It has been found that using very small current, little or no muscle reaction is obtained. It is apparent that the current strength should be above the rheobase of tissue, that is, the level at which muscular response commences. The voltage must be sufficiently high to overcome the resistance of the flesh and permit an activating current to flow therein. Although low voltages, that is those from 40 to 50 or even lower, produce stimulating effects, higher potentials of from 100 to 3,000 volts are preferred because of the greater certainty that attends their use. Still higher potentials seem to be unnecessary, might result in excessive current, and in fact introduce hazards to safety and problems in maintaining suitable insulation. The rate of impulse application may vary over a wide range, for example, from 10 to 150 or more impulses per second. While impulses at a rate lower than 10 per second will produce satisfactory results, so far as the reaction of the muscles is concerned, yet rhythmic or muscular response of the carcass may then occur to an undesired degree, and the time of treatment is somewhat prolonged.

On the other hand, muscles have a definite time response to excitation and so, if the frequency is too high, relatively little benefit will result. By way of example, desirable results have been obtained with the application of current from a condenser of ⅓ microfarad capacity charged to approximately 3,000 volts through a rectifier and discharged through the carcass by means, such as illustrated in Figure 1, at a rate of 20 impulses per second, or by treating with 60 cycle alternating current supplied from a 110 volt circuit, although a condenser discharge is preferred over the mere alternating current supply for reasons which have been pointed out in the companion concurrently-filed application referred to.

As for the combination of condensers which have been tried with satisfactory results, it is pointed out that condenser means of ⅓ microfarad capacity has been charged to a potential of 3,000 volts and discharged at the rate of 20 times per second for 10 minutes through a beef carcass with satisfactory results. Condenser means of the same capacity has been used with such a voltage, obtaining satisfactory results when treatment was continued at the same rate for only three minutes. Likewise a one microfarad condenser has been charged to a potential of 1750 volts and discharged through a beef carcass at the rate of 60 times per second for 10 minutes with desirable results. In each instance, the carcass was subjected to the same processing and chilling steps, and the same level of tenderness obtained. It will be noted that these conditions were selected to provide release of the same amount of energy in the carcass at each impulse, according to the usual formula.

Although preferred embodiments of my invention have been disclosed, it will be understood that modifications may be made within the spirit and scope of the appended claims. For example, I may if desired, treat only one half or other portion of a carcass at a time, rather than the whole.

I claim:

1. The method of treating meat, comprising passing electrical impulses, of short duration, at predetermined time intervals, and at potentials in the range between and including 3,000 to 1,750 volts, through the carcass of an animal very soon after slaughtering and bleeding, and before natural deterioration resulting in a substantial loss of nerve and muscle irritability has taken place, in order to effect tenderization.

2. The method of treating meat comprising passing electrical pulses of short duration and at potentials in the range between and including 3,000 and 1,750 volts, through a carcass of an animal, very soon after slaughtering and bleeding and before natural deterioration resulting in a substantial loss of nerve and muscle irritability has taken place, at the rate of between 20 and 60 times per second, for from 3 to 10 minutes, in order to effect tenderization.

3. Apparatus for tenderizing meat, comprising a carrying rail, a series of hook carriages with wheels supported on said rail, driving means for said carriages comprising an endless chain carried on pulleys, a drive pulley engaging said chain, a series of spaced pusher elements on said chain, each pusher element carrying a resiliently mounted current collector and an electrode connected thereto by a flexible conductor, a series of power rail sections paralleling said carrying rail and normally contacted by said current collectors, said sections being insulated from one another, and an electrical impulse-generating apparatus connected to each section, whereby an animal after knocking and bleeding may be supported by a hook carriage and have said electrode attached to its lower portion and then driven along said carrying track by one of said pusher elements until the collector on said element has traversed all the power rail sections, thereby giving the supported carcass a desired electrical treatment.

4. Apparatus for transporting carcasses through a treating area comprising an overhead track, a series of hook carriages with supporting wheels mounted on said track, an endless chain paralleling said track, means for driving said chain, a series of pusher elements carried by said chain, each pusher element insulatingly carrying a current collector and an insulated conductor terminating in an electrode depending therefrom, and a series of power sections paralleling said track, insulated from one another, normally engaged by said current collectors, and each one connected to impulse-generating means, whereby the pusher elements may drive along said hook carriages from which are suspended carcasses, while power is collected by said pusher elements from power rail sections, and electrical treatment given to suspend carcasses during such movement.

5. Apparatus for tenderizing meat comprising a carrying rail, a series of carriages supported on said rail, driving means for said carriages comprising a series of spaced pusher elements each of which carries a resiliently-mounted current collector, an electrode connected to each collector by a flexible conductor, a series of power rail setions paralleling said carrying rail and normally contacted by said current collectors, and electrical impulse generating apparatus connected to each section, whereby the carcass of an animal after knocking and bleeding may be supported by a carriage and have the corresponding electrode attached to its lower portion and then automatically moved along said carrying track until the collector on the pusher elements has traversed all the power rail sections.

6. Apparatus for transporting carcasses through a treating area comprising a track, a series of carriages mounted in said track, means for driving said carriages including a current collector for each, a conductor electrically connected to said collector, terminating in an electrode and depending from each drive means for connection with a carcass, and a series of power sections paralleling said track, normally engaged serially by said collector in order to supply power to said electrode, and each one connected to electrical impulse generating means, whereby said carcasses may be moved along one by one, while power is collected from the power rail sections, and electrical treatment given thereto.

7. In combination, electrodes adapted for engaging spaced portions of a freshly slaughtered animal, an electrical impulse-generating device connected to said electrodes, said device comprising a step-up transformer, the primary winding of which is connected to a source of alternating current, a two electrode rectifier with one terminal connected to one terminal of the secondary winding thereof, a condenser for being charged and connected between the other terminal of said secondary winding and the other terminal of said rectifier, and means connecting one side of said condenser to one of said electrodes and the other side of said condenser through a spark gap to the other electrode, whereby the condenser is alternately charged through the rectifier and may be independently discharged through the spark gap and an animal in series.

HARVEY C. RENTSCHLER.

REFERENCES CITED

The following references are of record in the file of this patent:

UNITED STATES PATENTS

| Number | Name | Date |
|---|---|---|
| 337,334 | Jones et al. | Mar. 2, 1886 |
| 645,612 | Westinghouse | Mar. 20, 1900 |
| 1,231,883 | Hassen | July 3, 1917 |
| 1,485,755 | Alcock | Mar. 4, 1924 |
| 2,179,105 | Sidney | Nov. 7, 1939 |
| 2,235,385 | Rava | Mar. 18, 1941 |
| 2,299,088 | Griffith | Oct. 20, 1942 |
| 2,387,221 | Williams et al. | Oct. 16, 1945 |

FOREIGN PATENTS

| Number | Country | Date |
|---|---|---|
| 548,618 | Great Britain | Oct. 16, 1942 |
| 555,593 | Great Britain | Aug. 30, 1943 |